United States Patent [19]

Kobres

[11] Patent Number: 5,148,147
[45] Date of Patent: Sep. 15, 1992

[54] VEHICLE DECELERATION MEASUREMENT SYSTEM

[76] Inventor: Arthur L. Kobres, 18510 Lake Shore Dr., Lutz, Fla. 33549

[21] Appl. No.: 623,183

[22] Filed: Dec. 3, 1990

[51] Int. Cl.⁵ .............................................. B60Q 1/90
[52] U.S. Cl. ................................. 340/464; 340/463; 340/466; 340/467; 340/479
[58] Field of Search .............. 340/466, 467, 464, 463, 340/479, 670, 671, 669

[56] References Cited

U.S. PATENT DOCUMENTS

| | | |
|---|---|---|
| 3,564,532 | 2/1971 | Ando . |
| 3,794,972 | 2/1974 | Van Ostrom . |
| 4,097,842 | 6/1978 | Zalar . |
| 4,107,647 | 8/1978 | Yoshino ............................... 340/669 |
| 4,366,546 | 12/1982 | Tachibana et al. ............. 364/426.02 |
| 4,594,574 | 6/1986 | Thurman . |
| 4,730,181 | 3/1988 | Perkins . |
| 4,751,493 | 6/1988 | Miller . |
| 4,772,868 | 9/1988 | Chen ................................... 340/522 |
| 4,800,377 | 1/1989 | Slade ................................... 340/467 |
| 4,841,276 | 6/1989 | Abel et al. ............................. 340/466 |

*Primary Examiner*—Donnie L. Crosland

[57] ABSTRACT

An independent multimode safety and convenience apparatus for motor vehicles wherein real-time deceleration rate data is accurately communicated to following vehicles via amber and red lensed indicators. Rate of deceleration is converted directly to a warning signal on/off flash rate, amber in color. When deceleration results in a stop, the amber rate signaling is instantly exchanged for a steady signal of red color, automatically. Visible projection of this vital information for several hundred feet to the rear of a vehicle provides extra reaction time resulting in substantially enhanced risk assessment for following motorists. A sustained low speed mode offers compatibility with stop-and-go, bumper-to-bumper traffic. Automatically adjusting to this mode, the indicator then displays conventional red brake signals only. Tailoring operation in response to the monitoring of traffic conditions results in improved overall intelligibility. In no case does the indicator display both amber and red signals simultaneously.

2 Claims, 4 Drawing Sheets

VEHICLE DECELERATION MEASUREMENT SYSTEM

BACKGROUND

1. Field of Invention

This invention relates to a vehicular safety warning system, more specifically, one capable of displaying both forward deceleration rate and full stop information automatically.

2. Description of Prior Art

Heretofore, deceleration indicating systems have been configured using incomplete information formats generated by compromised electrical circuitry. Traditionally, vehicles have been equipped simply with rear mounted red indicators illuminated in response to brake pedal actuation. Over time, inventors have recognized a need to enhance this abbreviated deceleration indicating convention. Earlier improvements have not been generally successful due to inherent limitations, such as:

(a) Many earlier arrangements were limited from the outset by suggesting inappropriate origination of the required speed reference signal. For example, Miller U.S. Pat. No. 4,751,493 (1988) and Perkins U.S. Pat. No. 4,730,181 (1988) suggest deceleration sensing by merely providing an on/off switch for the accelerator pedal. Some suggest a sensing connection to the engine, as in Zalar et al. U.S. Pat. No. 4,097,842 (1978) and Chen U.S. Pat. No. 4,772,868 (1988). It is not necessary nor desirable to announce every closure of the engine throttle. It is only important to show the vehicle is beginning to slow significantly. Another method suggests a weighted pendulum for g-force detection. A mechanical pendulum possesses questionable traits with respect to inclines, sensitivity and dampening. Yoshino U.S. Pat. No. 4,107,647 (1978) shows this sensing arrangement. Since these various methods aren't directly associated with a vehicle wheel, they can't be precisely related to vehicle speed as they should be.

(b) Other systems, desiring to obtain a reference signal more closely related to vehicle speed, suggest a rotating shaft or wheel associated with the drive-train act as part of a generator to produce a reference voltage. The amplitude of the voltage is thereby directly related to vehicle speed. For example, Ando U.S. Pat. No. 3,564,532 (1971) suggests this method. While technically more appropriate, this arrangement is none the less dependent upon generating a specific range of operating voltage from all transducer installations. Therefore, this method is inherently sensitive to transducer properties and individual installation peculiarities.

(c) Some prior art suggests speed sensing means be physically connected to the vehicle speedometer. This is not a practical method since provision for such attachment is generally not available on existing vehicles. For example, Thurman U.S. Pat. No. 4,594,574 (1986) suggests this difficult speedometer attachment requirement.

(d) Once initially detecting deceleration, most prior art simply energizes a signal in a preprogrammed manner, neglecting the opportunity to communicate specific real-time deceleration rate information via the indicator. For example, Van Ostrom U.S. Pat. No. 3,794,972 (1974) suggests this shortcoming.

(e) Some prior art suggests continuously signaling a warning at all times during low speed vehicle operation is desirable. Abel, et al. U.S. Pat. No. 4,841,276 (1989), for example, demonstrates this concept. Such signaling will likely help gain the attention of motorists approaching from the rear. However, prolonged signaling is likely to create a degree of annoyance for the motorist if he is then trapped in bumper-to-bumper, stop-and-go traffic. He then prefers to know only when the brake of the lead vehicle is applied.

OBJECTS AND ADVANTAGES

In view of the above mentioned limitations of previous systems, the object of the current invention is to provide a deceleration measurement and indicating system capable of accurately communicating to following motorists all stages of a typical deceleration cycle.

(a) A more specific object of this invention is to provide a system that responds only to a significant level of deceleration, ignoring momentary throttle closures, road irregularities and other irrevelent events.

(b) A more specific object of this invention is to provide that vehicle drive-shaft or wheel speed be measured in terms of frequency, so as to be insensitive to transducer output differences.

(c) A more specific object of this invention is to provide that installation, including the speed sensing attachment, be easily accomplished for existing vehicles.

(d) A more specific object of this invention is to provide that complete deceleration information be accurately communicated through the indicator. "Complete", in this case, means communicating initial deceleration caused by wind resistance or engine braking, wheel brake application forces and a full stop indication just as forward motion ceases.

(e) A more specific object of this invention is to provide a "sustained low speed mode" which specifically inhibits automatic indicator signaling in bumper-to-bumper traffic. This mode is enabled by measuring speed and time and directs the indicator to function as a conventional center mounted third brake light.

Figure 1:
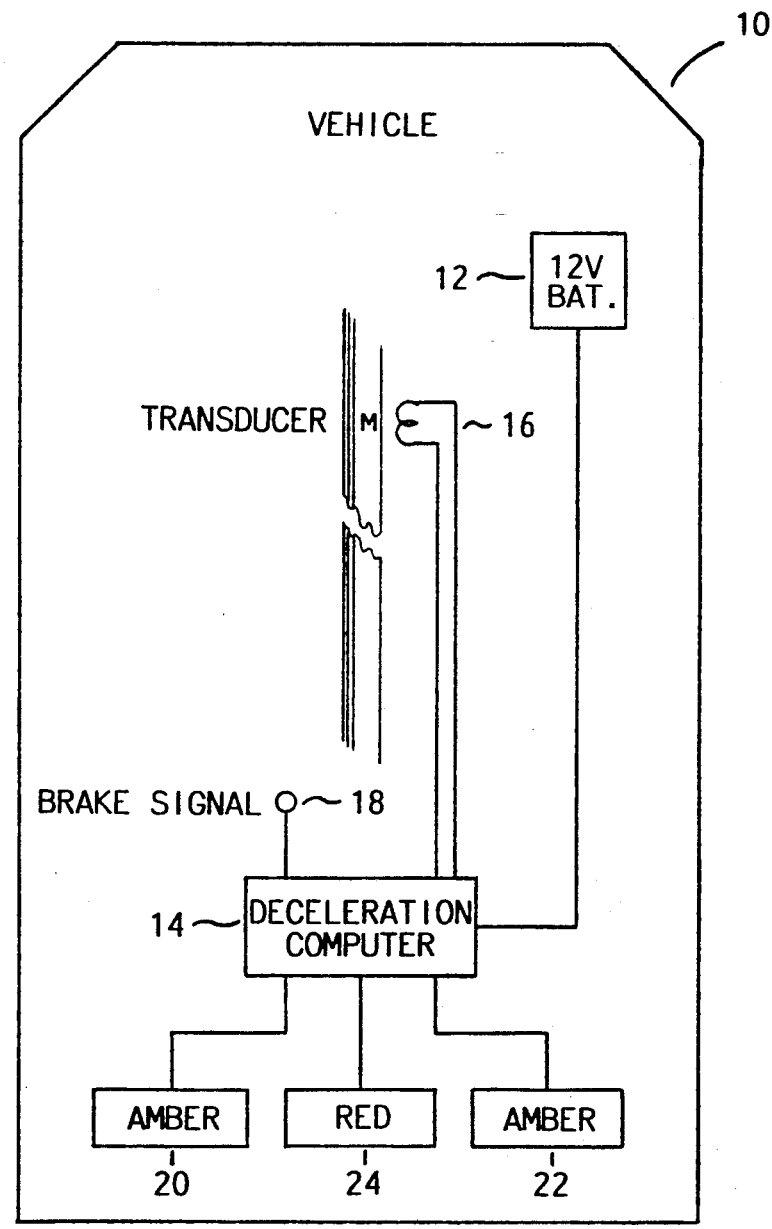
FIG. 1 shows the overall system configuration.

REFERENCE NUMERALS IN DRAWINGS 10 vehicle
12 storage battery
14 deceleration computing circuit
16 speed reference transducer
18 brake circuit input
20 amber deceleration lamp ch. 1
22 amber deceleration lamp ch. 2
24 red stop lamp
30 speed reference comparator
32 frequency to voltage converter
34 nonpolarized capacitor
36 deceleration reference divider
38 deceleration detect comparator
40 voltage to frequency converter
42 output circuit
44 mode control circuit
46 transducer voltage divider
48 PLL F/V decade divider
50 F/V converter capacitor
52 unity gain buffer
54 base sensitivity adjust divider 56 auto sensitivity level shifter
58 mode detection comparator
60 V/F converter input amplifier
62 deceleration gating transistor ch. 1
64 deceleration gating transistor ch. 2
66 output driver transistor ch. 1
68 output driver transistor ch. 2
70 output Darlington pair ch. 1
72 output Darlington pair ch. 2
74 180 phase shift inverter
76 brake signal interface transistor
78 mode latch
80 initialization capacitor
82 mode latch input inverter
84 deceleration clamp transistor ch. 1
86 deceleration clamp transistor ch. 2
88 thirty second monostable multivibrator
90 auto stop gating transistor
92 auto stop relay transistor
94 stop detect monostable multivibrator
96 auto stop deceleration clamp transistor ch. 1
98 auto stop deceleration clamp transistor ch. 2
100 time out coupling capacitor
102 low speed mode stop relay transistor
104 brake signal interface transistor
106 gating transistor for stop relay
108 stop reset transistor

DESCRIPTION OF THE PREFERRED EMBODIMENT

FIGS. 1 to 3A and 3B

As illustrated in FIG. 1, a block diagram of the preferred embodiment is disclosed. Shown is a vehicle 10 having connected thereto a conventional storage battery 12 which supplies power to various electrical equipment, including in this case, the proposed deceleration measuring and indicating equipment.

The deceleration computing circuit 14 has an input 16 which accepts shaft or wheel speed information. While a magnetically induced electrical pulse is described, it is obvious to one skilled in the art that other means could be employed to develop the required speed reference signal. The deceleration computer 14 also has an input 18 accepting a 12 volt direct current signal upon application of the conventional brake.

The deceleration computer 14 has an output providing power to an amber indicator 20. Similarly, an output is provided for a second amber indicator 22. The deceleration computer 14 also has a third output providing power to a red indicator 24 which is positioned between the amber indicators 20 and 22. The three indicators are oriented so as to be viewed from the rear of the vehicle and mounted high as is practical for maximum visibility.

The improved vehicle deceleration indicating system operates in the following manner. With the vehicle 10 in motion, drive-shaft or wheel speed is detected by the transducer 16. On initial start, and sensing a speed less than approximately 25-30 m.p.h., the deceleration computer 14 responds by permitting only the red indicator 24 to be energized upon application of the conventional vehicle brake 18 as required.

Sensing a speed above approximately 25-30 m.p.h., the deceleration computer 14 becomes fully enabled. At that time, the red indicator 24 is inhibited and the amber indicators 20 and 22 are permitted to respond to deceleration signals detected by the computer 14. Upon detecting significant vehicle 10 deceleration, the computer 14 will respond by energizing the amber indicators 20 and 22 in the following manner. If initial deceleration is slight, the amber indicators 20 and 22 are alternately energized at a specific slow rate. As deceleration forces increase, resulting from wind resistance, engine braking, or wheel braking, the amber indicators 20 and 22 are energized at an increasingly faster rate. A high rate of deceleration causes rapid flashing. Following motorists are enabled to judge accurately the rate of deceleration confronting them. Motorists have been taught that flashing amber signals represent a communication of caution. Brief exposure allows motorists to recognize that a specific level of caution is also being communicated.

Detecting that vehicle speed has fallen to approximately 25-30 m.p.h., the deceleration computing circuit responds in the following manner. If a full stop is completed within approximately 30 seconds, amber indicators 20 and 22 communicate rate information until that time. The moment forward motion ceases, the red indicator 24 is energized and the amber indicators 20 and 22 are extinguished, automatically.

Detecting that the vehicle has been operated less than 25-30 m.p.h. for approximately 30 seconds without stopping, the deceleration computer 14 responds by reverting to the "sustained low speed" mode. In this mode, unwarranted amber deceleration signaling ceases and a preferable brake signal is communicated via the red indicator 24. Only by accelerating above 25-30 m.p.h., will the deceleration computer 14 again become fully enabled. The time out period is limited to approximately 30 seconds in order to lessen the probability that back-up brake circuit activation of the deceleration signal may initially occur. This results in improved definition of system mode characteristics which lessens potential for confusion or doubt.

Figure 2:
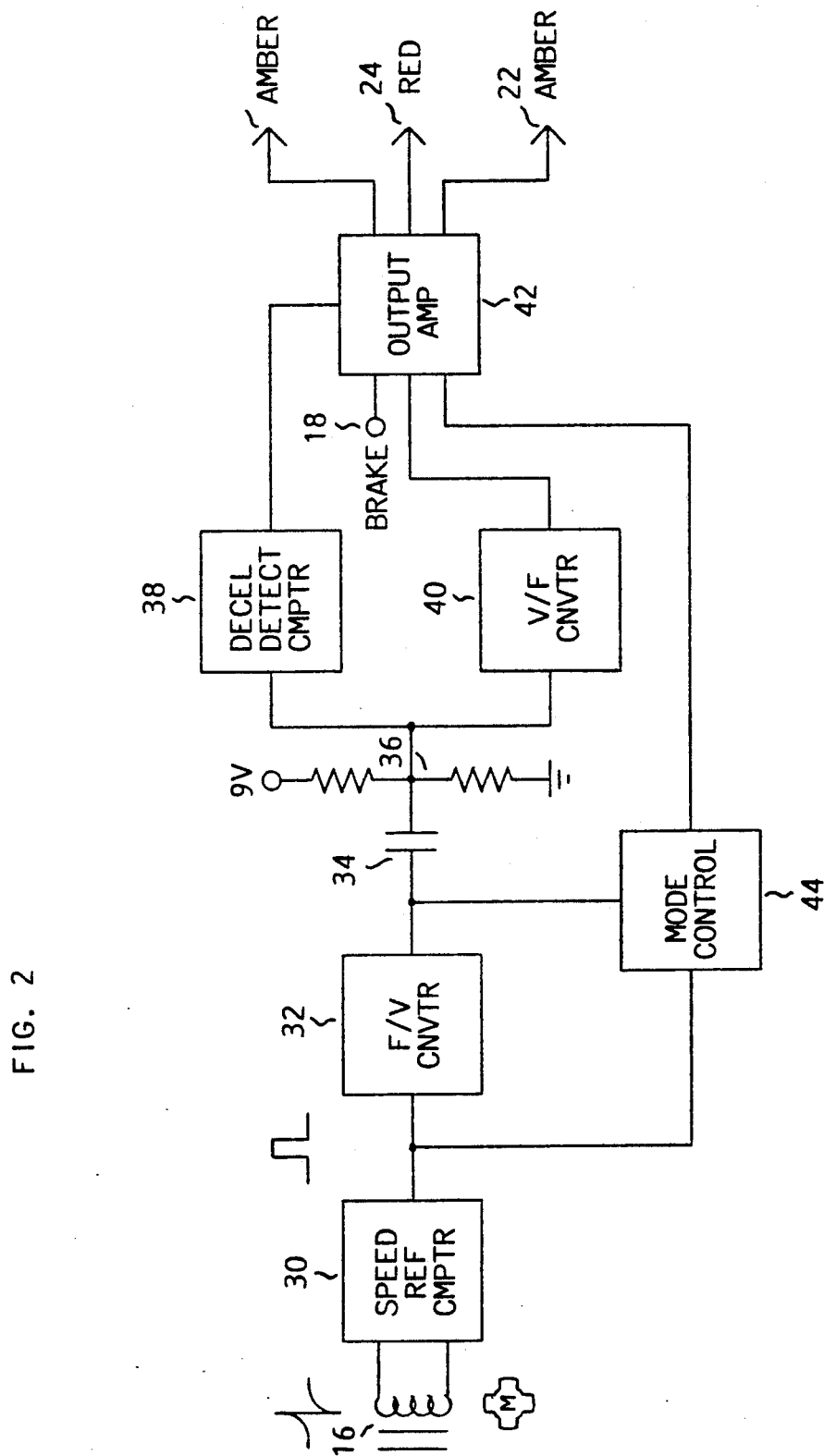
FIG. 2 shows a simplified block diagram of the deceleration computing circuit.

Illustrated in FIG. 2 is a simplified block diagram of the deceleration computing circuit that is the foundation of the present invention. A comparator 30 produces a pulse in response to a voltage difference between opposing ends of the transducer coil. A small magnet attached to a shaft or wheel causes the coil to produce the voltage. A phase-locked loop frequency to voltage converter 32 provides a linear direct current output voltage in response to input pulses representing vehicle shaft or wheel revolution frequency. The voltage thus generated causes a capacitor 34 to charge and discharge through a deceleration reference voltage divider 36. When the effect of the capacitor 34 causes the voltage at the divider 36 to be less than the normal one-half supply value, a deceleration detect comparator 38 outputs a true logic level. The magnitude of divider 36 voltage excursion represents the particular deceleration rate being detected. Excursions are measured by a voltage to frequency converter 40, thus generating the specific warning rate frequency. The two deceleration signals are combined and amplified in an output circuit 42. The output circuit also accepts a 12 volt direct current signal from the conventional brake circuit in order to function properly in the low speed mode. An alternating 12 volt direct current output is provided for the two amber deceleration warning indicators. A 12 volt direct current output is also provided for the red stop indicator function. A mode control circuit 44 determines the appropriate operating mode, limiting indicator response so as to promote maximum intelligibility for varying traffic conditions as previously described.

Figure 3A:
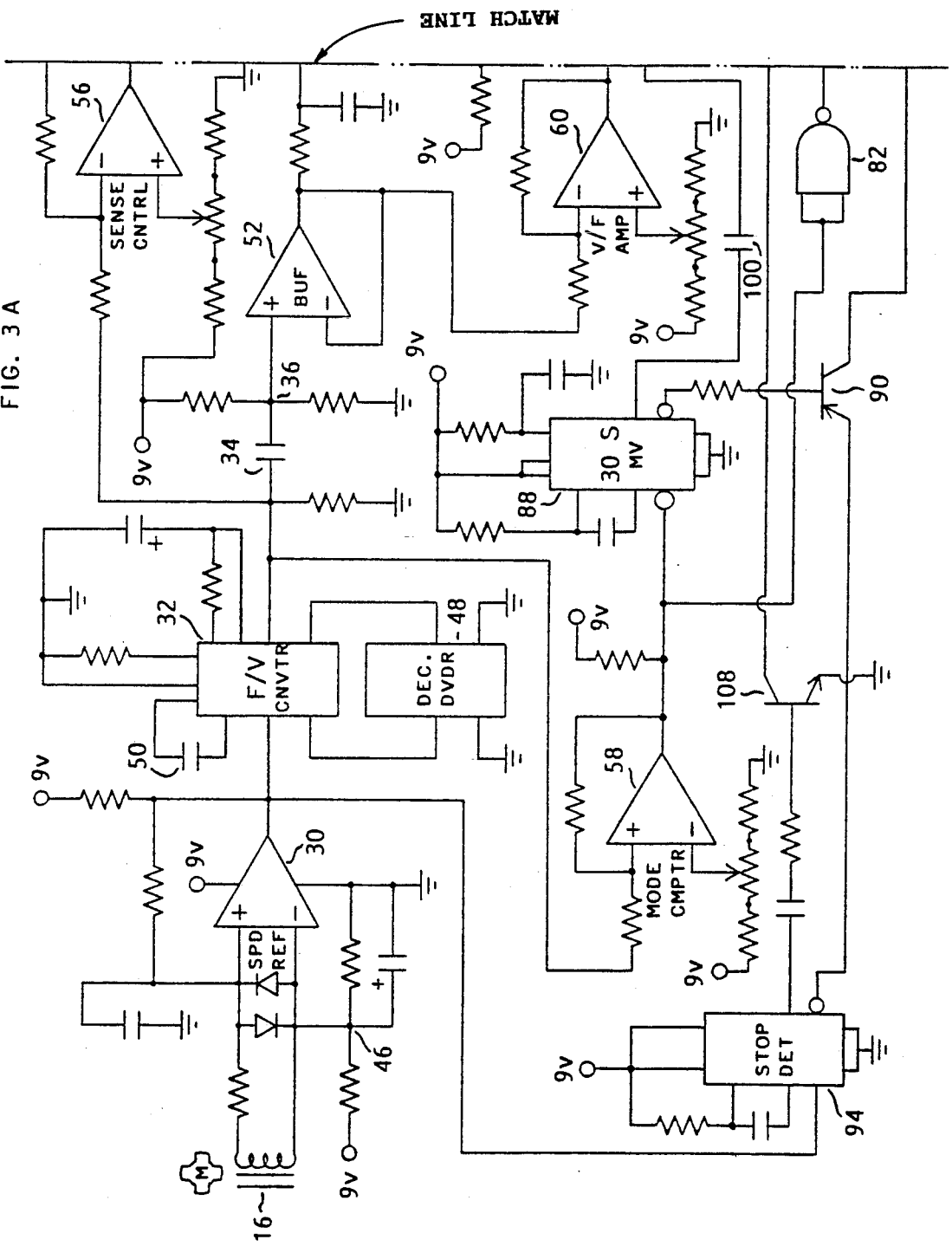
FIGS. 3A and 3B show the specific circuit of the invention in substantial detail.
Figure 3B:
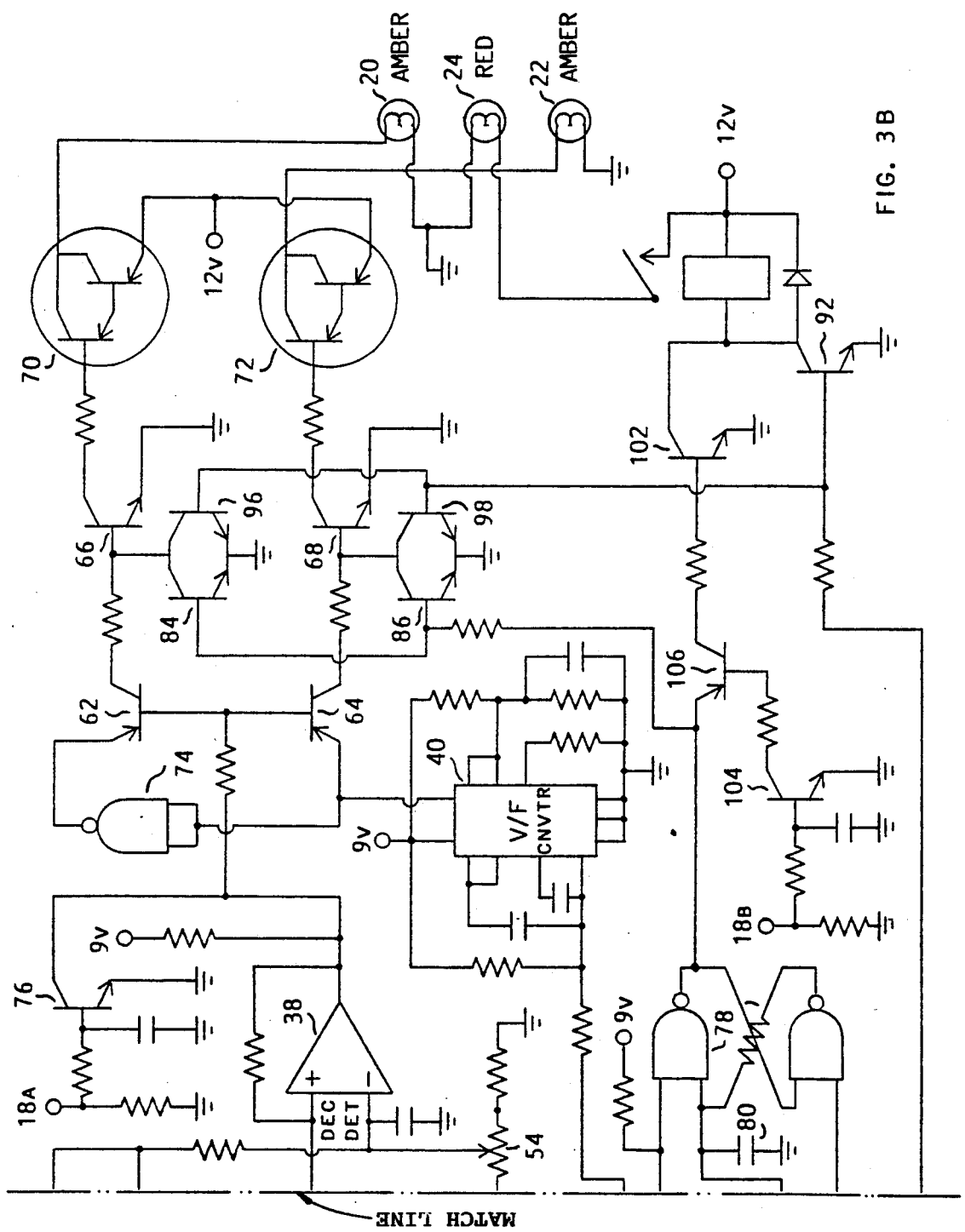

Illustrated in FIGS. 3A and 3B is the specific circuit that is the foundation of the present invention. Electric pulses are generated via a small magnet passing a transducer coil 16. One end of the coil is connected to the inverting input of a speed reference comparator 30. This point is maintained at one-half supply voltage by a conventional voltage divider 46. The opposite end of the coil is connected to the noninverting input of the comparator 30 through a current limiting resistor. Whether faint or strong, any output from the coil results in the comparator 30 producing optimum shaped logic pulses of a frequency representing vehicle velocity.

This logic signal is presented to a frequency to voltage converter 32. The phase-locked loop is operated in the frequency multiplication mode. This mode enables it to respond well to frequencies representing low vehicle speeds. The frequency multiplication mode is made possible principally by a decade divider 48 and a capacitor 50. The demodulated output signal of the frequency to voltage converter 32 is a linear representation of vehicle speed. This key signal is used in three ways.

First, with minimal additional processing, it provides both a logic level identifying deceleration and a means for quantification of the signal. This is accomplished via a connection to a nonpolarized capacitor 34, wherein this capacitor is caused to charge and discharge through a deceleration reference voltage divider 36. The static voltage level established by the divider 36 is one-half supply voltage. Relative to that voltage, the dynamic level present while underway is an accurate representation of either acceleration, steady speed or deceleration status. The magnitude of voltage excursion from the one-half supply value will be an accurate representation of rate. In order to prevent undesirable loading of the megohm value divider 36, the output is buffered. This is accomplished by a unity gain buffer 52. This modified branch of the frequency to voltage converter 32 output is then used two ways. One, it is applied to the noninverting input of a deceleration detect comparator 38 and is available on the output as a logic signal. The logic signal provides status for steady/accelerating or decelerating. This response is assured because the deceleration comparator 38 has a voltage level on its inverting input compatible with that of deceleration reference divider 36. Basic system sensitivity is controlled by the adjustment of this voltage level as provided by a voltage divider 54. Two, this modified branch of the frequency to voltage converter 32 output is used to enable measurement of the specific rate of deceleration being detected. The rate information is provided by a voltage to frequency converter 40. The input voltage for the converter 40 is derived from the deceleration reference divider 36 via the buffer 52 and an amplifier 60. Therefore, divider 36 excursions representing deceleration rate are converted directly to a corresponding deceleration signaling frequency.

A second use for the direct, unmodified output of frequency to voltage converter 32 is to obtain automatic sensitivity control. At lower speeds, maximum available sensitivity to deceleration signals is desired. At higher speeds, however, sensitivity may be reduced. If not, deceleration signals will be detected by events such as road irregularities or insignificant changes in throttle setting. However, before the demodulated output voltage from the frequency to voltage converter 32 can be used for sensitivity control, it must first be offset to insure compatibility with the level established by the deceleration reference divider 36. This is accomplished via a sensitivity control level shifter 56. As vehicle speed increases, the level shifter 56 applies increasing bias to the inverting input of the deceleration detect comparator 38. The trigger point of the comparator is thus altered to insure that it continues to respond only to significant deceleration, even at higher speeds.

With the deceleration detect comparator 38 responding only to a significant level of deceleration, regardless of initial vehicle speed, its output may then be used to enable the rate information generated by the voltage to frequency converter 40 to be amplified for output. Transistors 62 and 64 pass this information to the output drivers 66 and 68. Darlington pair output stages 70 and 72 provide full 12 volt battery voltage for the amber indicators 20 and 22. An inverter 74 insures the deceleration indicators are driven 180 degrees out of phase. In the event that deceleration is not promptly detected by the deceleration detect comparator 38, as in the chance case of acceleration followed by sudden braking, a means is provided via a transistor 76 to insure the amber indicators are initially energized via a conventional brake signal.

Lastly, the unmodified output of the frequency to voltage converter 32 is used to detect the low speed mode. This is accomplished by a mode detect comparator 58. The comparator 58 has a voltage equivalent of 25-30 m.p.h. present on its inverting input at all times. A conventional voltage divider provides this set point. With the demodulated output of frequency to voltage converter 32 present on the mode detect comparator's 58 noninverting input, a logic signal will be available on the output representing low or high speed status.

Described thus far is a means to accurately measure and communicate deceleration signals plus a means to detect whether present speed is above or below a given set point. Remaining to be described is a means to insure the proper mode is selected in response to varying traffic conditions. Mode latching is provided by an RS latch 78. The latch 78 initializes in the low speed mode due to the effect of a capacitor 80 resulting in a logic high output. Upon accelerating and attaining a speed of 25-30 m.p.h., the latch 78 output is forced low representing the high speed mode. This is the result of the mode detect comparator 58 and an inverter 82 changing states. Deceleration clamp transistors 84 and 86 are thus disabled, permitting deceleration signals to pass to output drivers 66 and 68.

Eventual deceleration below 25-30 m.p.h. is detected by the mode detect comparator 58 which causes triggering of a 30 second monostable multivibrator 88. When the m.v. 88 is initially triggered, the sole effect is to enable a pass transistor 90. Thus, for 30 seconds, this transistor 90 allows stop indicator relay drive transistor 92 to be energized by the stop detect monostable multivibrator 94 if the m.v. goes untriggered due to loss of vehicle motion. Upon such an occurrence, deceleration clamp transistors 96 and 98 are immediately energized to insure maximum intelligibility of the red stop signal 24.

In the event that a full stop is not detected by the stop detect monostable multivibrator 94 within the 30 second time out period, one of two possibilities must occur. First, if a speed above 25-30 m.p.h. is resumed before completion of the 30 second time out, the mode latch 78 will continue to maintain the high speed mode as provided by the mode detect comparator 58 and the inverter 82. Therefore, the time out completion pulse coupled by a capacitor 100 will be ignored by the mode latch 78. Last, if a speed above 25-30 m.p.h. is not resumed before the 30 second time out, the completion pulse coupled by the capacitor 100 will cause the mode latch 78 to be set to the low speed mode. The consequent logic high output causes deceleration clamp transistors 84 and 86 to conduct, inhibiting further communication of automatic deceleration signaling. The logic high output provided by the mode latch 78 may then be used to energize the stop indicator relay transistor 102 via transistors 104 and 106 which are themselves energized by application of a conventional 12 volt direct current brake signal as required.

It is possible for a vehicle to fall below 25-30 m.p.h., stop completely, then resume speed, all within 30 seconds. Without precautionary measures, the amber indicators 20 and 22 could flash briefly upon acceleration because they would still be enabled for the 30 second period. This could occur due to the fact that the frequency to voltage converter 32 would lose phase lock upon a complete stop and would have to regain lock upon acceleration. To prevent the possibility of such an occurrence, the mode latch 78 is forced into the low speed mode after each stop. This is accomplished using the stop detect monostable multivibrator 94. The device always changes output logic state when the vehicle moves from a stop. This signal is coupled to a transistor 108 which produces a pulse setting the latch to the low speed mode. Thus, amber indicators 20 and 22 are disabled by the clamp transistors 84 and 86 until 25-30 m.p.h. is attained, providing time for the phase-locked loop converter 32 to lock.

Hence, a description of a means to allow comprehensive communication of the most appropriate deceleration information for a given condition of vehicle operation is complete.

It will be apparent from the above description that the invention, particularly in the preferred embodiment illustrated in FIGS. 1 to 3, achieves all of the objects set forth at the beginning of the specification. This includes excellent response limited to actual vehicle deceleration only, vehicle velocity precisely measured by means of a frequency multiplication technique, ease of installation is assured because the speed transducer is a simple bolt on unit that is relatively immune to environmental effects, all stages of a conventional deceleration cycle are accurately communicated through the indicator for a distance of several hundred feet and lastly, a sustained low speed results in the cancellation of unwarranted and annoying automatic deceleration information and the substitution of a more desirable wheel brake signal. It is felt the invention can add an important new dimension to overall safety. Additionally, an appreciable measure of simple convenience is provided for following drivers. Especially benefiting would be manual transmission equipped vehicles because their operators often down-shift for deceleration, as in the case of motorcycles, in particular, resulting in no warning signal whatsoever.

While a particular embodiment of a vehicle deceleration indication system herein shown and disclosed in detail is fully capable of attaining the objects and others hereinbefore stated, it is to be understood that it is merely illustrative as the presently preferred embodiment of the invention and that no limitations are intended to the details of constructions or designs herein shown other than as defined in the appended claims.

I claim:

1. A deceleration measuring and indicating system for a motor vehicle that includes a rotating member comprising;

a sensing means for detecting angular velocity of said rotating member, said sensing means comprising a transducer for generating pulses representative of the angular velocity of said rotating member;

a phase locked loop frequency to voltage converter for receiving pulses generated from said transducer and outputting signals that are a linear representation of vehicle speed;

computation means for receiving the output signals from the phase locked loop frequency to voltage converter and generating first and second deceleration signals, said computation means comprising means responsive to said linear output signals for selected voltage transitions, a deceleration detector comparator adapted to respond to a selected negative voltage transition for outputting an enable signal, a voltage to frequency converter adapted to gauge extent of said selected voltage transitions and producing a warning rate logic signal;

stop detect means that is responsive to the transducer's generated pulses for producing a vehicle stop logic signal, said stop detect means comprising a first monostable multivibrator adapted to time out in response to loss of pulses generated by said transducer thereby generating a vehicle stop logic signal;

mode control means for detection of a selected period of slow speed operation as governed by the output signals from said frequency to voltage converter, said mode control means including a mode comparator responsive to said output signals, a second monostable multivibrator to be triggered by said mode comparator and outputting an inhibit logic signal;

output amplifier means for controlling the energization of a plurality of indicators, said indicators being red and amber in color, said output amplifier means comprising a clamping means for automatically grounding said warning rate logic signal upon detection of said vehicle stop logic signal, and a control switching means for controlling energization of said plural indicators, said control switching means comprising a transistor operatively connected to a relay;

whereby said output amplifier means in response to said inhibit logic signal inhibits energization of the amber indicators while allowing the red indicators to be energized;

and whereby said output amplifier means, in response to both the enable signal and the warning rate logic signal, energizes said amber indicators alternately, at a rate directly proportional to a rate of the warning rate logic signal; and whereby said output amplifier means in response to a vehicle stop logic signal inhibits energization of the amber indicators while allowing the red indicators to be energized.

2. A deceleration measuring and indicating system for a motor vehicle that includes a rotating member comprising;

a sensing means for detecting angular velocity of said rotating member, said sensing means comprising a transducer for generating pulses representative of the angular velocity of said rotating member;

a phase locked loop frequency to voltage converter for receiving pulses generated from said transducer and outputting signals that are a linear representation of vehicle speed;

computation means for receiving the output signals from the phase locked loop frequency to voltage converter and generating first and second deceleration signals, said computation means comprising means responsive to said linear output signals for selected voltage transitions, a deceleration detector comparator adapted to respond to a selected negative voltage transition for outputting an enable signal, a voltage to frequency converter adapted to gauge extent of said selected voltage transitions and producing a warning rate logic signal;

stop detect means that is responsive to the transducer's generated pulses for producing a vehicle stop logic signal, said stop detect means comprising a first monostable multivibrator adapted to time out in response to loss of pulses generated by said transducer thereby generating a vehicle stop logic signal;

output amplifier means for controlling the energization of a plurality of indicators, said indicators being red and amber in color, said output amplifier means comprising a clamping means for automatically grounding said warning rate logic signal upon detection of said vehicle stop logic signal, and a control switching means for controlling energization of said plural indicators, said control switching means comprising a transistor operatively connected to a relay;

and whereby said output amplifier means, in response, to both the enable signal and the warning rate logic signal energizes said amber indicators alternately, at a rate directly proportional to a rate of the warning rate logic signal;

whereby said output amplifier means, in response to a vehicle stop logic signal inhibits energization of the amber indicators while allowing the red indicators to be energized.

* * * * *